United States Patent
Toyama et al.

(10) Patent No.: US 9,050,934 B2
(45) Date of Patent: Jun. 9, 2015

(54) WIRE HARNESS

(75) Inventors: Eiichi Toyama, Kosai (JP); Shigemi Hashizawa, Kosai (JP)

(73) Assignee: Yazaki Corporation, Tokyo (JP)

( * ) Notice: Subject to any disclaimer, the term of this patent is extended or adjusted under 35 U.S.C. 154(b) by 137 days.

(21) Appl. No.: 13/577,420

(22) PCT Filed: Feb. 2, 2011

(86) PCT No.: PCT/JP2011/052130
§ 371 (c)(1),
(2), (4) Date: Aug. 6, 2012

(87) PCT Pub. No.: WO2011/096426
PCT Pub. Date: Aug. 11, 2011

(65) Prior Publication Data
US 2012/0305308 A1    Dec. 6, 2012

(30) Foreign Application Priority Data
Feb. 5, 2010    (JP) ................... 2010-023718

(51) Int. Cl.
*H02G 3/04*     (2006.01)
*B60R 16/02*    (2006.01)
(Continued)

(52) U.S. Cl.
CPC .......... *B60R 16/0207* (2013.01); *H02G 3/0468* (2013.01); *H02G 3/0481* (2013.01); *H01B 7/0861* (2013.01); *H01B 7/428* (2013.01)

(58) Field of Classification Search
CPC ............. B60R 16/0207; H02G 3/0481; H02G 3/0468; H01B 7/428; H01B 7/0861
USPC .................. 174/70, 70 A, 70 B, 107
See application file for complete search history.

(56) References Cited

U.S. PATENT DOCUMENTS 4,571,450 A * 2/1986 Duffy ........................... 174/68.3
5,001,304 A * 3/1991 Hardin et al. ................. 174/107
(Continued)

FOREIGN PATENT DOCUMENTS

EP        2298608 A1    3/2011
JP        2-137095 A    11/1990
(Continued)

OTHER PUBLICATIONS

Supplementary European Search Report dated Jun. 6, 2013, issued for the European patent application No. 11739774.5.
International Search Report from PCT/JP2011/052130 A1 dated May 10, 2011.
Notification of the First Office Action dated Dec. 20, 2013, issued for the Chinese patent application No. 201180013538.0 and English translation thereof.

*Primary Examiner* — Lisa Lea Edmonds
*Assistant Examiner* — Keith Depew
(74) *Attorney, Agent, or Firm* — Locke Lord LLP (57) ABSTRACT

A wire harness having good heat-release performance as well as having simple structure and configuration and can be manufactured at low cost is provided. Also, the wire harness which can fulfill electromagnetic shield function is provided. A wire harness 21 includes a thick high-voltage electric wire 22 which electrically connects an inverter 4 and a battery 5, a tubular protection member 23 arranged outside of the high-voltage electric wire 22 so the high-voltage electric wire is passed therethrough, and a heat-transfer-and-shield member 24 made of metal. The tubular protection member 23 includes a cylindrical circular pipe 26 having good heat-release performance, two corrugated tubes 32 and two protectors 33. The heat-transfer-and-shield member 24 is one component constituting the high-voltage electric wire 22 and is arranged in indirect contact with an inner face 27 of the circular pipe 26.

9 Claims, 6 Drawing Sheets (51) Int. Cl.
H01B 7/08 (2006.01)
H01B 7/42 (2006.01)

(56) References Cited

U.S. PATENT DOCUMENTS

| | | | |
|---|---|---|---|
| 5,084,594 A * | 1/1992 | Cady et al. | 174/36 |
| 5,112,419 A * | 5/1992 | Nakagawa | 156/51 |
| 5,180,884 A * | 1/1993 | Aldissi | 174/36 |
| 6,870,105 B2 * | 3/2005 | Maydanich et al. | 174/72 TR |
| 7,094,970 B2 | 8/2006 | Kihira | |
| 2009/0095525 A1 | 4/2009 | Watanabe | |
| 2010/0122831 A1 * | 5/2010 | Watanabe | 174/107 |
| 2011/0088944 A1 * | 4/2011 | Ogue et al. | 174/72 A |
| 2011/0133548 A1 * | 6/2011 | Toyama et al. | 307/9.1 |
| 2011/0174515 A1 * | 7/2011 | Siahaan et al. | 174/107 |
| 2011/0209893 A1 * | 9/2011 | Yu et al. | 174/107 |

FOREIGN PATENT DOCUMENTS

| | | |
|---|---|---|
| JP | 9-180824 A | 7/1997 |
| JP | 2004-171952 A | 6/2004 |
| JP | 2004-172476 A | 6/2004 |
| JP | 2007-073413 A | 3/2007 |
| JP | 2007-305416 A | 11/2007 |
| WO | WO-2006/118273 A1 | 11/2006 |
| WO | WO-2009/025349 A1 | 2/2009 |
| WO | WO-2010-001670 A1 | 1/2010 |
| WO | WO 2010001670 A1 * | 1/2010 |
| WO | WO-2011-078234 A1 | 6/2011 |

* cited by examiner

WIRE HARNESS

TECHNICAL FIELD

The present invention relates to a wire harness to be wired in a motor vehicle.

BACKGROUND ART

A conventional wire harness having a plurality of unshielded electric wires and a metallic shield pipe, the plurality of the unshielded electric wires being passed through the metallic shield pipe, is disclosed in Patent Document 1. According to this disclosure, the shield pipe fulfills electromagnetic shield and protection for electric wire, thereby providing a simple structure of the wire harness even with using the unshielded electric wires.

However, the conventional wire harness having the shield pipe which fulfills the electromagnetic shield function has a problem as explained below, due to an air layer existing between the shield pipe and the unshielded electric wire. That is, when applying current, heat generated at the unshielded electric wire is shielded by the air having low thermal conductivity so the generated heat is less transferred to the shield pipe. In addition, since the shield pipe does not include a ventilation pathway for ventilating air, the heat generated at the unshielded electric wire remains inside of the shield pipe, lowering the heat-release performance.

Patent Document 2 discloses a technology for dealing with the above-described problem. In Patent Document 2, there is disclosed a wire harness having a structure which prevents heat from remaining inside of the shield pipe and which improves the heat-release performance. Specifically, there is provided a resin layer which is wrapped around an outer circumference of the unshielded electric wire. Thus, when the resin layer is in contact with an inner circumference of the shield pipe, the heat generated at the unshielded electric wire can be transferred to the shield pipe and can be released from the shield pipe.

CITATION LIST

Patent Document

[Patent Document 1]
Japanese Patent Application Publication No. 2004-171952
[Patent Document 2]
Japanese Patent Application Publication No. 2007-73413

SUMMARY OF INVENTION

Technical Problem

In the conventional wire harness disclosed in Patent Document 2, there are problems such as, the structure and configuration of the wire harness being complicated and manufacturing cost being increased to improve the heat-release performance, and the structure and configuration of an end portion of the shield pipe being complicated to fulfill the electromagnetic shield function.

In view of the above-described problems, an object of the present invention is to provide a wire harness having improved heat release performance which has simple structure and configuration and which can be manufactured at low cost. Another object of the present invention is to provide the wire harness having simple structure and configuration to fulfill the electromagnetic shield function with.

Solution to Problem

In order to achieve the above-described abject, the present invention provides, in a first aspect, a wire harness having: an electric wire, a tubular protection member arranged outside of the electric wire so as to pass the electric wire through the tubular protection member, a heat-transfer member made of metal and arranged in direct or indirect contact with an inner face of the tubular protection member, wherein the heat-transfer member is arranged to be wrapped around a sheath or an insulating member of the electric wire over a substantially entire length of the electric wire.

According to the present invention having the above-described feature, since the heat-transfer member is wrapped around the sheath or the insulating member of the electric wire over the substantially entire length of the electric wire, the heat generated at the electric wire can spread uniformly by the heat-transfer member. With the heat-transfer member in which the heat spreading uniformly, by arranging this heat-transfer member to directly or indirectly contact with the inner face of the tubular protection member, the heat can be effectively transferred to the tubular protection member and can be released from the tubular protection member to the external environment. In the present invention, it is preferable that the heat-transfer member is in direct contact with the inner face of the tubular protection member.

In order to achieve the above-described abject, the present invention provides, in a second aspect, the wire harness according to the first aspect, wherein the heat-transfer member is directly or indirectly contacted with the inner face of the tubular protection member by self-weight of the electric wire.

According to the present invention having the above-described feature, the heat-transfer member can be arranged in direct or indirect contact with the inner face of the tubular protection member without the need of providing special structure and configuration.

In order to achieve the above-described abject, the present invention provides, in a third aspect, the wire harness according to the first or the second aspect, wherein the tubular protection member is formed to have a cross-sectional shape selected from a group of: a substantially circular cross-sectional shape; a substantially square cross-sectional shape; and a substantially rectangular cross-sectional shape, wherein the tubular protection member is selected to conform to the cross-sectional shape of the electric wire.

According to the present invention having the above-described feature, it is possible to provide a large contact surface with respect to the heat-transfer member. It is also possible to pass the electric wire through a minimum space and to reduce the height of a portion where the wire harness is wired.

In order to achieve the above-described abject, the present invention provides, in a forth aspect, the wire harness according to the first or the second aspect, wherein the electric wire includes a plurality of insulated electric wires having the insulating member and a conducting body covered with the insulating member, wherein the plurality of insulated electric wires is arranged so that the electric wire is formed to have a cross-sectional shape selected from a group of: a substantially square cross-sectional shape; a substantially rectangular cross-sectional shape; and a substantially oval cross-sectional shape.

According to the present invention having the above-described feature, it is possible to provide a large contact surface with respect to the tubular protection member. It is also possible to pass the electric wire through the tubular protection member with a minimum space and to reduce the height of a portion where the wire harness is wired.

In order to achieve the above-described abject, the present invention provides, in a fifth aspect, the wire harness according to any one of the first to the forth aspects, wherein the heat-transfer member is used as a member which fulfills a shield function.

According to the present invention having the above-described feature, the shield function can be fulfilled by the heat-transfer member.

Advantageous Effects of Invention

According to the first and the second aspects of the present invention, there can be provided the wire harness having good heat-release property which has simple structure and configuration and which can be manufactured at low cost.

According to the third and the forth aspects of the present invention, in addition to the above-described advantageous effects, the heat-release performance can be improved and space-saving and height reduction can be achieved.

According to the fifth aspect of the present invention, there is provided the wire harness which can fulfill the electromagnetic shield function while having simple structure and configuration.

DESCRIPTION OF EMBODIMENTS

A wire harness according to the present invention may include an electric wire, a tubular protection member arranged outside of the electric wire, and a metallic heat-transfer member wrapped around a sheath or an insulating member of the electric wire over the substantially entire length of the electric wire. Furthermore, the wire harness according to the present invention is arranged such that the heat-transfer member wrapped around the sheath or the insulating member of the electric wire is in direct or indirect contact with an inner face of the tubular protection member.

Exemplary Embodiments

Figure 1:
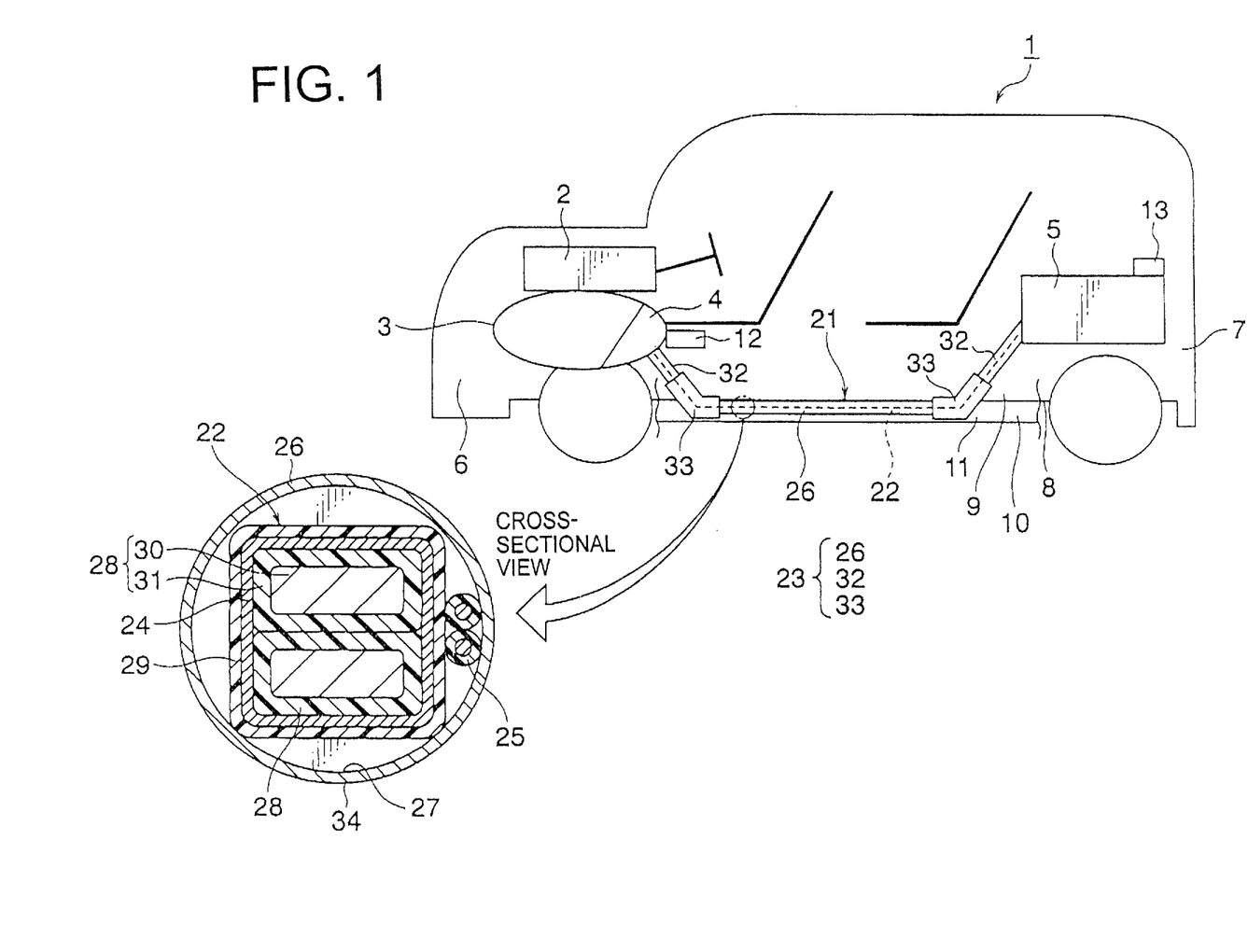
FIG. 1 is a schematic diagram of a motor vehicle in which a wire harness according to the present invention is wired.
Figure 2A:
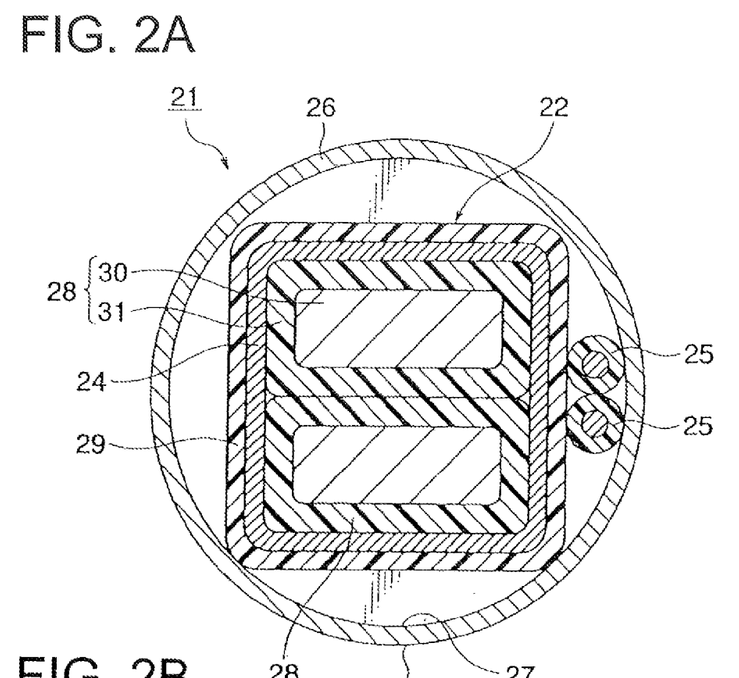
FIG. 2A is a cross-sectional view of the wire harness.
Figure 2B:
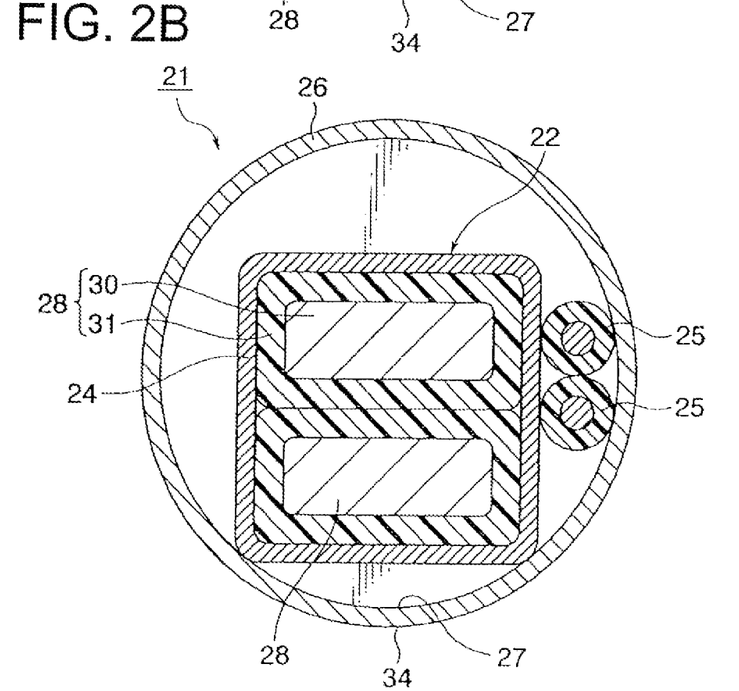
FIG. 2B is a cross-sectional view of the wire harness.

In the following, one exemplary embodiment of the present invention is explained in reference with the drawings. FIG. 1 is a schematic diagram of a motor vehicle in which a wire harness according to the present invention is wired. FIGS. 2A and 2B are cross-sectional view of the wire harness.

A wire harness according to this embodiment is, but not limited to, a wire harness to be wired in a hybrid vehicle or an electric vehicle. Herein a hybrid vehicle is taken as an example (i.e., a wire harness of the present invention is basically the same for an electric vehicle in structure, configuration and advantageous effect).

Referring to FIG. 1, a reference sign 1 represents a hybrid vehicle. The hybrid vehicle 1 is driven by a mixture of two powers which are an engine 2 and a motor 3, wherein power from a battery 5 is supplied to the motor 3 via an inverter 4. According to this embodiment, the engine 2, the motor 3 and the inverter 4 are mounted at a vehicle internal-front portion 6 where a front wheel is located. The battery 5 is mounted at a vehicle internal-rear portion 7 where a rear wheel is located (these mount locations are illustrative only).

A reference sign 8 represents a vehicle body frame. In FIG. 1, a vehicle body above-floor 9 is located above the vehicle body frame 8, and a vehicle body under-floor 10 is located below the vehicle body frame 8. The vehicle body under-floor 10 includes a reinforcement member 11 having a convex cross-sectional shape for increasing strength of the motor vehicle. The reinforcement member 11 is arranged to extend to the front and rear of the motor vehicle. A reference sign 12 located in the vehicle internal-front portion 6 represents an electrical junction box such as a well-known relay box. A reference sign 13 located in the vehicle internal-rear portion 7 represents a well-known low-voltage battery 13 (the arrangement of the low-voltage battery 13 shown is illustrative only).

In this embodiment, the motor 3 includes a motor and a generator, and the inverter 4 includes an inverter and a converter. The inverter 4 is an inverter assembly, and the inverter 4 may include, for example, an inverter for air conditioning system, an inverter for generator and an inverter for motor and such. The battery 5 may be a NiMH battery or a Li-ion battery which is modularized. In addition, it is possible to use an electrical storage device such as a capacitor. The battery 5 may be any suitable battery usable in the hybrid vehicle or the electric vehicle.

The inverter 4 and the battery 5 are connected to each other by a wire harness 21 of the present invention.

In FIGS. 1, 2A and 2B, the wire harness 21 of the present invention includes a thick high-voltage electric wire 22 (electric wire) which is arranged to electrically connect the inverter 4 and the battery 5, a tubular protection member 23 arranged outside of the high-voltage electric wire 22 so as to pass the high-voltage electric wire 22 through the tubular protective member 23, and a metallic heat-transfer-and-shield member 24 (heat-transfer member). In this embodiment, the wire harness 21 further includes a plurality of well-known low-voltage electric wires 25, but it is not limited to this (in this embodiment, the low-voltage electric wire 25 is provided for positioning the low-voltage battery 13 at the vehicle internal-rear portion 7; and this embodiment is intended to provide modularization).

The wire harness 21 is arranged to extend from the vehicle internal-front portion 6 through the vehicle body under-floor 10 to the vehicle internal-rear portion 7. The wire harness 21 is arranged to penetrate through the vehicle body frame 8.

In the case of FIG. 2A, the heat-transfer and shield member 24 is provided as one component constituting the high-voltage electric wire 22 and is arranged in indirect contact with an inner face 27 of a later-described circular pipe 26 constituting the tubular protection member 23. Meanwhile, in the case of FIG. 2B, the heat-transfer-and-shield member 24 is arranged at an outer circumference of the high-voltage electric wire 22 such that the heat-transfer-and-shield member 24 is in direct contact with the inner face 27 of the circular pipe 26. In the wire harness 21, the configuration of the high-voltage electric wire 22 varies based on the arrangement and location of the heat-transfer-and-shield member 24. The arrangement and location of the heat-transfer-and-shield member 24 may be either one of FIGS. 2A and 2B. In the following, each of the above-described components of the wire harness 21 is explained.

In the case of FIG. 2A, the above-described high-voltage electric wire 22 includes two insulated electric wires 28, the heat-transfer-and-shield member 24 and a sheath 29, the heat-transfer-and-shield member 24 being arranged inside of the heath 29. Meanwhile, in the case of FIG. 2B, the high-voltage electric wire 22 includes two insulated electric wires 28, and the heat-transfer-and-shield member 24 is arranged at outer circumferences of the two insulated electric wires 28, i.e. at an outer circumference of the high-voltage electric wire 22. In the either case of FIGS. 2A and 2B, the two insulated electric wires 28 are arranged one above the other. By positioning the two insulated electric wires 28 one above the other, the high-voltage electric wire 22 is formed into a substantially square cross-sectional shape (shown cross-sectional shape is illustrative only; the cross-sectional shape being a substantially square shape has advantage that a later-described inner diameter of the circular pipe 26 can be made small as much as possible; it is noted that the number and the arrangement of the insulated electric wire 28 shown herein are illustrative only).

In addition, although it is not expressly shown in this embodiment, the high-voltage electric wire may include two insulated electric wires and a sheath covering in a lump the two insulated electric wires. Also, in such high-voltage electric wire, the heat-transfer-and-shield member may be arranged at the outer circumference of the sheath.

The insulated electric wire 28 is a so-called flat-rectangular-shaped single core electric wire for high-voltage and is provided with a conducting body 30 having a substantially rectangular cross-sectional shape and an insulating member 31 arranged to cover the conducting body 30 with uniform thickness. The insulated electric wire 28 is formed into a substantially rectangular cross-sectional shape to conform to the shape of the conducting body 30. The conducting body 30 is made of copper, copper alloy, aluminum or the like. The insulating member 31 is formed of insulating resin material using extrusion molding. Such insulated electric wire 28 is provided with connectors (not shown) formed at both ends of the insulated electric wire 28, the connector having a terminal clamp for connection with a device.

The heat-transfer-and-shield member 24 is a metallic member having good thermal conductivity and electric conductivity and is wrapped around the insulating members 31 of the two insulating electric wires 28 arranged one above the other over the substantially entire length of the insulating member 31. In one specific example, the heat-transfer-and-shield member 24 is wrapped around the insulating member 31 over a portion between the above-described connectors not shown. The heat-transfer-and-shield member 24 is arranged in close contact with the insulating member 31, i.e. so that no air layer is produced between the heat-transfer-and-shield member 24 and the insulating member 31. Such heat-transfer-and-shield member 24 has electromagnetic shield function as measures against electromagnetic wave and is formed of a braid or a metal film. Both ends of the heat-transfer-and-shield member 24 are fowled in a fashion connectable with respect to a ground portion of a device (one example of connecting method includes, but not limited to, clamping).

The sheath 29 is formed of insulating resin material using extrude molding. The sheath 29 is arranged as a cover member protecting the two insulated electric wires 28.

The low-voltage electric wire 25 described above is a well-known thin electric wire and is passed through the tubular protection member 23 together with the high-voltage electric wire 22 for external protection. The low-voltage electric wire 25 has one end connected to the above-described electrical junction box 12 and the other end connected to the low-voltage battery 13.

The tubular protection member 23 described above is a tubular-shaped member constituted of one or more tubular members connected to each other and is provided to protect the high-voltage electric wire 22. The tubular protection member 23 is formed so as to have sufficient strength needed to protect the high-voltage electric wire 22. The tubular protection member 23 is arranged within a range in which the high-voltage electric wire 22 needs to be protected. As is the case with the heat-transfer-and-shield member 24, the tubular protection member 23 according to this embodiment is arranged within a long range over a portion between the above-described connectors not shown (this is illustrative only; in another example, the tubular protection member 23 may be arranged only to the vehicle body under-floor 10 and within a relatively short range).

The tubular protection member 23 includes a cylindrical circular pipe 26 having good heat-release performance, two corrugated tubes 32 and two protectors 33. Such tubular protection member 23 is formed by connecting the circular pipe 26 and the corrugated tube 32 to each other using the protector 33. The circular pipe 26 is arranged along the vehicle body under-floor 10. The corrugated tube 32 is arranged at the vehicle internal-front portion 6 and the vehicle internal-rear portion 7. The protector 33 is provided as a connecting member and as a fixing member with respect to the vehicle body.

The circular pipe 26 and the corrugated tube 32 may be made of metal or synthetic resin. In this embodiment, the circular pipe 26 is made of metal and the corrugated tube 32 is made of synthetic resin. The circular pipe 26 may be made of any material as long as an outer face 34 of the circular pipe 26 has good heat-release performance and an inner face 27 of the circular pipe 26 has good heat-absorption performance with respect to the high-voltage electric wire 22 (one preferable example of the material will be described later). In this embodiment, the circular pipe 26 is formed as a common standard pipe. In addition, a common corrugated tube is used for the corrugated tube 32.

In regards to the tubular protection member 23, the above-described structure is only one example. For example, the tubular protection member 23 may only include circular pipe 26, or may only include corrugated tube 32. In other examples, the tubular protection member 23 may utilize not only the protector 33 but may utilize a metallic bracket and such, as long as the tubular protection member 23 can be fixed to the vehicle body.

An inner diameter of the circular pipe 26 and the corrugated tube 32 is arranged so that the high-voltage electric wire 22 having a substantially square cross-sectional shape can be passed through. Especially for the circular pipe 26, the inner diameter is designed to be small so that a space between the circular pipe 26 and the high-voltage electric wire 22 does not become large, thereby reducing size and weight of the circular pipe 26. In the circular pipe 26, the high-voltage electric wire 22 is arranged to contact the lower portion of the inner face 27 by the self-weight of the high-voltage electric wire 22 (in the case of FIG. 2B the heat-transfer-and-shield member 24 is arranged to contact the lower portion of the inner face; such contact due to the self-weight is advantageous in light of simplicity).

The following will provide supplemental explanation for the case when the circular pipe 26 is made of metal. As a matter of course, by forming the circular pipe 26 with metal, protection performance can be improved compared to the circular pipe 26 made of resin. In the case of forming the circular pipe 26 with metal, one example of the material includes stainless material from the point of view of protection performance and weather resistance. Also, another preferable example of the material includes aluminum from the point of view of protection performance and weight-saving. In the explanation herein, the material is aluminum Next, manufacture and wiring will be explained based on the above-described structure and configuration. In the present invention, the high-voltage electric wire 22 and the low-voltage electric wire 25 are passed through the tubular protection member 23, followed by processing (e.g. providing a connector and a terminal clamp) the respective ends of the high-voltage electric wire 22 and the low-voltage electric wire 25 exposed from the both ends of the tubular protection member 23, thereby completing the manufacture of the wire harness 21 of the present invention. The manufactured wire harness 21 is then mounted at predetermined location in the motor vehicle in an assembling facility of a motor vehicle manufacturer, thereby completing wiring.

As explained above in reference with FIGS. 1, 2A and 2B, according to the present invention, the metallic heat-transfer-and-shield member 24 is wrapped around the insulating member 31 of the high-voltage electric wire 22 over the substantially entire length of the insulating member 31. Thus, heat generated at the high-voltage electric wire 22 can spread uniformly by the heat-transfer-and-shield member 24. In addition, with the heat-transfer-and-shield member 24 in which the heat spreading uniformly, by arranging this heat-transfer-and-shield member 24 in direct or indirect contact with especially the inner face 27 of the circular pipe 26 of the tubular protection member 23, the heat can be effectively transferred to the circular pipe 26 and can be released from the circular pipe 26 to external environment. Thus, the present invention can prevent heat from remaining inside. Therefore, the present invention can provide the wire harness 21 having improved heat-release performance compared to the conventional art.

Furthermore, according to the present invention, the structure and configuration can be simplified compared to the conventional art, thereby reducing manufacturing cost. According to the present invention, by using the heat-transfer-and-shield member 24, the electromagnetic shield function can be fulfilled with the simplified structure and configuration.

Of course, the present invention can be changed and practiced without departing from the gist of the present invention.

Herein, the wire harness 21 of the present invention is wired between the inverter 4 and the battery 5; however, for example, the wire harness 21 of the present invention may be wired only at the vehicle body under-floor 10. In addition, the conducting body 30 is not necessarily the flat-rectangular-shaped single core; it may be a circular single core or may be formed by twisted wire elements and such.

Figure 3A:
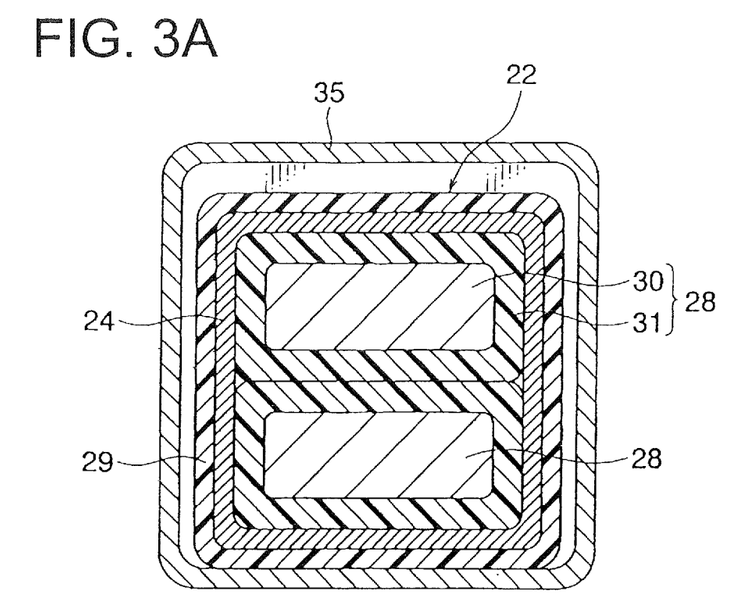
FIG. 3A is a cross-sectional view of a wire harness according to another embodiment (showing: flat-rectangular-shaped single core electric wires arranged one above the other so as to form a substantially square cross-sectional shape; and a rectangular pipe).
Figure 3B:
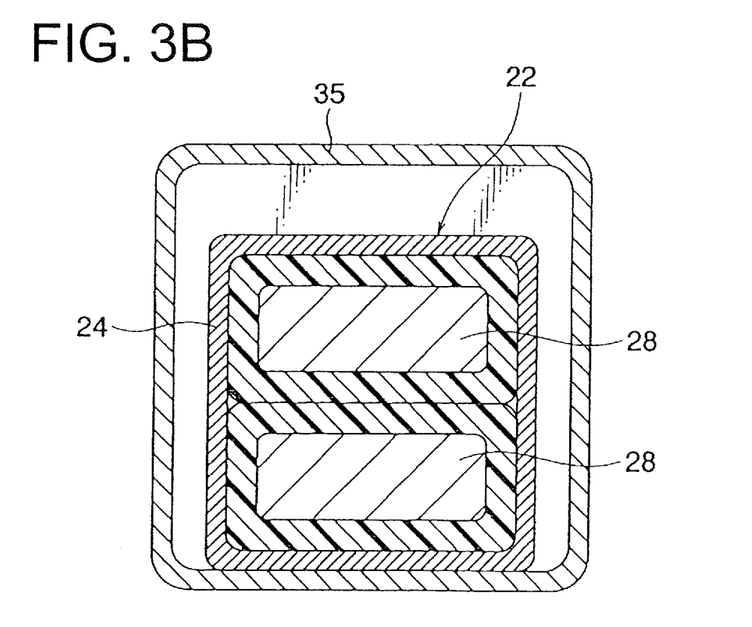
FIG. 3B is a cross-sectional view of a wire harness according to another embodiment (showing: flat-rectangular-shaped single core electric wires arranged one above the other so as to form a substantially square cross-sectional shape; and a rectangular pipe).
Figure 4A:
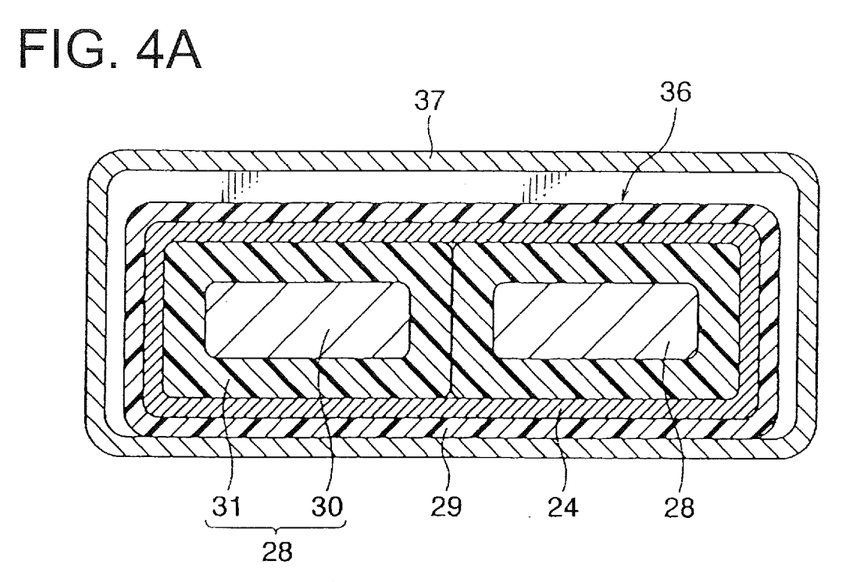
FIG. 4A is a cross-sectional view of a wire harness according to another embodiment (showing: flat-rectangular-shaped single core electric wires arranged to right and left so as to form a substantially rectangular cross-sectional shape; and a flat rectangular pipe).
Figure 4B:
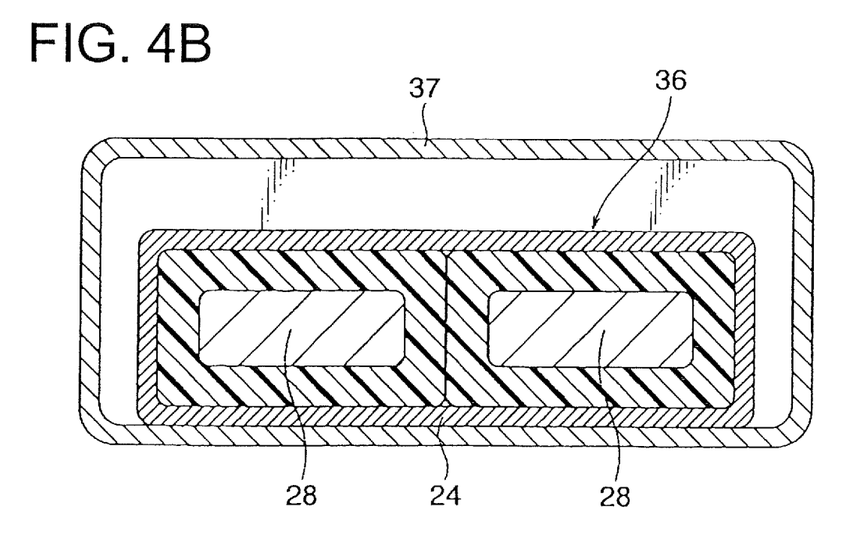
FIG. 4B is a cross-sectional view of a wire harness according to another embodiment (showing: flat-rectangular-shaped single core electric wires arranged to right and left so as to form a substantially rectangular cross-sectional shape; and a flat rectangular pipe).
Figure 5A:
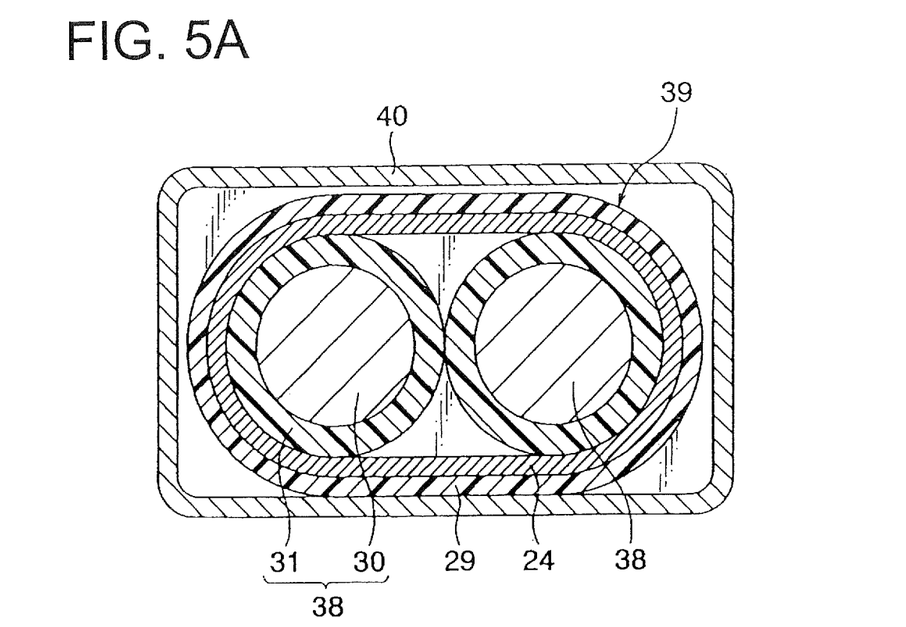
FIG. 5A is a cross-sectional view of a wire harness according to another embodiment (showing: round single core electric wires arranged to right and left so as to from a substantially oval cross-sectional shape; and a flat rectangular pipe).
Figure 5B:
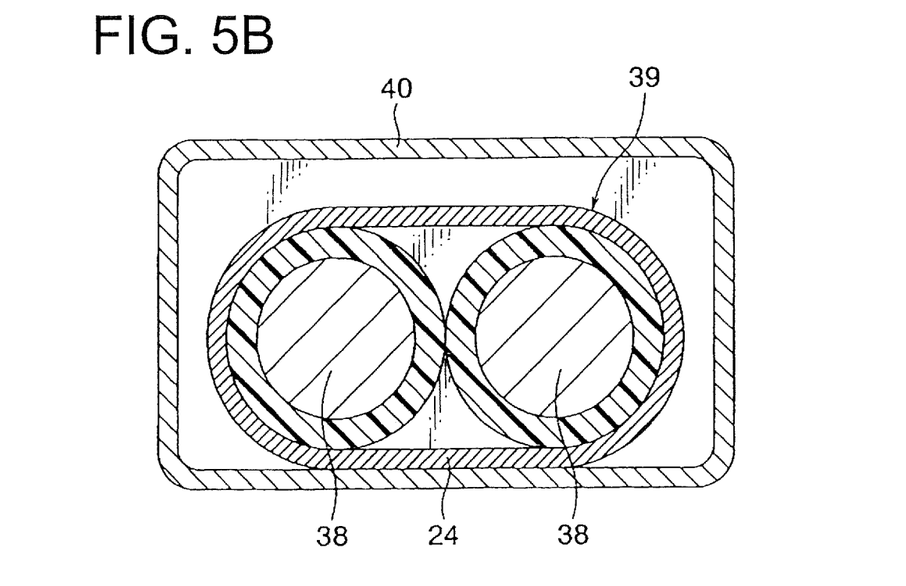
FIG. 5B is a cross-sectional view of a wire harness according to another embodiment (showing: round single core electric wires arranged to right and left so as to from a substantially oval cross-sectional shape; and a flat rectangular pipe).

In the present invention, it is preferable to provide a large contact surface in order to improve heat-release performance. Thus, it is effective to use a rectangular pipe 35 as shown in FIGS. 3A and 3B instead of the circular pipe 26. Moreover, as shown in FIGS. 4A and 4B, it is effective to arrange the two insulated electric wires 28 to right and left to form a high-voltage electric wire 36 having a substantially rectangular cross-sectional shape, while using a flat rectangular pipe 37. Moreover, as shown in FIGS. 5A and 5B, it is effective to arrange two circular single core electric wires (insulated electric wires 38) to right and left to form a high-voltage electric wire 39 having a substantially oval-shaped cross-sectional shape, while using a flat rectangular pipe 40.

In the cases of FIGS. 4A through 5B, the height of the wire harness is reduced so that a distance from a ground can be made long to prevent damage to the wire harness, thus the height can be reduced compared to the cases of FIGS. 2A through 3B.

Figure 6A:
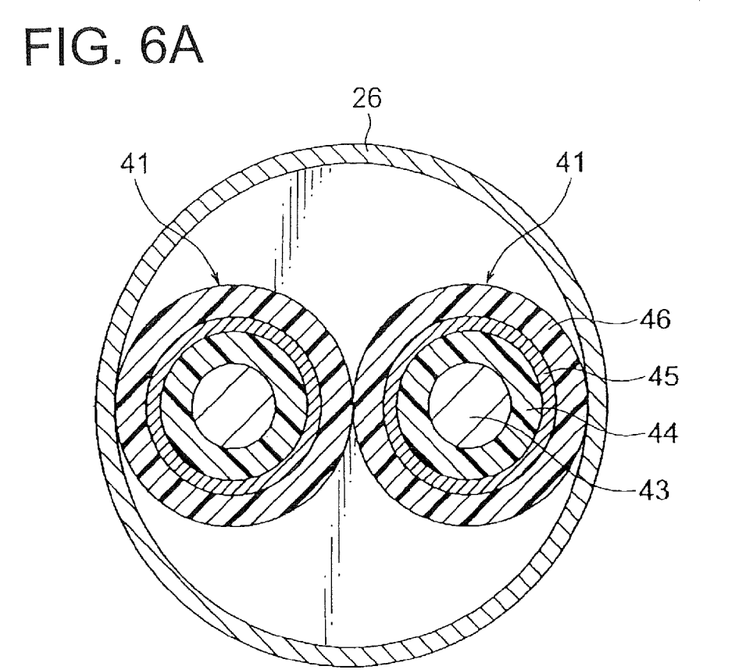
FIG. 6A is a cross-sectional view of a wire harness according to another embodiment (a shielded electric wire is used).
Figure 6B:
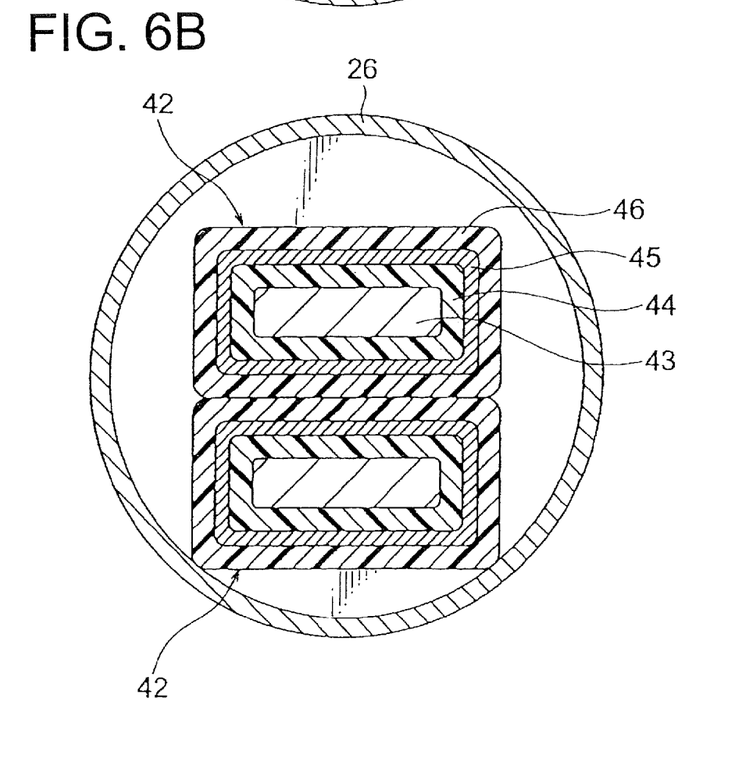
FIG. 6B is a cross-sectional view of a wire harness according to another embodiment (a shielded electric wire is used).

In the cases of FIGS. 1 through 5B, the high-voltage electric wire formed of the insulated electric wire is used; however it is not limited to this, and it is possible to use a high-voltage shielded electric wire 41 or 42 (electric wire) as shown in FIGS. 6A and 6B. The shielded electric wire 41 or 42 may include a central conducting body 43, an insulating member 44 arranged outside of the central conducting body 43, a shield member 45 arranged outside of the insulating member 44 and a sheath 46 arranged outside of the shield member 45. The shield member 45 is formed with a braid or a metal film and functions as a heat-transfer member according to the present invention.

REFERENCE SIGNS LIST 1 hybrid vehicle
2 engine
3 motor
4 inverter
5 battery
6 vehicle internal-front portion
7 vehicle internal-rear portion
8 vehicle body frame
9 vehicle body above-floor
10 vehicle body under-floor
11 reinforcement member
12 electrical junction box
13 low-voltage battery
21 wire harness
22 high-voltage electric wire (electric wire)
23 tubular protection member
24 heat-transfer-and-shield member (heat-transfer member)
25 low-voltage electric wire
26 circular pipe
27 inner face
28 insulated electric wire
29 sheath
30 conducting body
31 insulating member
32 corrugated tube 33 protector
34 outer face
35 rectangular pipe
36 high-voltage electric wire (electric wire)
37 flat rectangular pipe
38 insulated electric wire
39 high-voltage electric wire (electric wire)
40 flat rectangular pipe
41, 42 shielded electric wire (electric wire)
43 central conducting body
44 insulating body
45 shield member (heat-transfer member)
46 sheath

The invention claimed is:

1. A wire harness comprising:
an electric wire,
a tubular protection member arranged outside of the electric wire so as to pass the electric wire through the tubular protection member,
a heat-transfer member made of metal and arranged in direct or indirect contact with an inner face of the tubular protection member,
wherein the heat-transfer member is arranged to be wrapped around a sheath or an insulating member of the electric wire over an entire length of the electric wire without a gap,
wherein the tubular protection member is a pipe and fully wraps around the electric wire, and
wherein the electric wire includes a plurality of insulated electric wires having the insulating member and a conducting body covered with the insulating member, wherein the plurality of insulated electric wires is arranged so that the electric wire is formed to have a cross-sectional shape selected from a group of: a substantially square cross-sectional shape; and a substantially rectangular cross-sectional shape.

2. The wire harness according to claim 1, wherein the heat-transfer member is directly or indirectly contacted with the inner face of the tubular protection member by self-weight of the electric wire.

3. The wire harness according to claim 2, wherein the tubular protection member is formed to have a cross-sectional shape selected from a group of: a substantially circular cross-sectional shape; a substantially square cross-sectional shape; and a substantially rectangular cross-sectional shape, wherein the tubular protection member is selected to conform to the cross-sectional shape of the electric wire.

4. The wire harness according to claim 3, wherein the heat-transfer member is used as a member which fulfills a shield function.

5. The wire harness according to claim 2, wherein the heat-transfer member is used as a member which fulfills a shield function.

6. The wire harness according to claim 1, wherein the tubular protection member is formed to have a cross-sectional shape selected from a group of: a substantially circular cross-sectional shape; a substantially square cross-sectional shape; and a substantially rectangular cross-sectional shape, wherein the tubular protection member is selected to conform to the cross-sectional shape of the electric wire.

7. The wire harness according to claim 6, wherein the heat-transfer member is used as a member which fulfills a shield function.

8. The wire harness according to claim 1, wherein the heat-transfer member is used as a member which fulfills a shield function.

9. The wire harness according to claim 1, wherein the heat-transfer member is used as a member which fulfills a shield function.

* * * * *